United States Patent
Gao et al.

(10) Patent No.: US 11,965,114 B2
(45) Date of Patent: Apr. 23, 2024

(54) POWDER COATING USED FOR HOUSEHOLD APPLIANCE COILED MATERIAL AND PREPARATION METHOD THEREOF

(71) Applicant: KINTE MATERIALS SCIENCE AND TECHNOLOGY CO., LTD., Guangdong (CN)

(72) Inventors: Qingfu Gao, Guangdong (CN); Jianqun Ouyang, Guangdong (CN); Li Cheng, Guangdong (CN); Xiaohua Yang, Guangdong (CN); Longhe Xiao, Guangdong (CN)

(73) Assignee: KINTE MATERIALS SCIENCE AND TECHNOLOGY CO., LTD., Guangdong (CN)

( * ) Notice: Subject to any disclaimer, the term of this patent is extended or adjusted under 35 U.S.C. 154(b) by 534 days.

(21) Appl. No.: 17/282,884

(22) PCT Filed: Jan. 10, 2020

(86) PCT No.: PCT/CN2020/071401
§ 371 (c)(1),
(2) Date: Apr. 5, 2021

(87) PCT Pub. No.: WO2020/186912
PCT Pub. Date: Sep. 24, 2020

(65) Prior Publication Data
US 2021/0355328 A1 Nov. 18, 2021

(30) Foreign Application Priority Data
Mar. 20, 2019 (CN) .......................... 201910211309.8

(51) Int. Cl.
| | | |
|---|---|---|
| *C09D 5/03* | (2006.01) | |
| *C09D 7/62* | (2018.01) | |
| *C09D 7/63* | (2018.01) | |
| *C09D 7/80* | (2018.01) | |
| *C09D 167/00* | (2006.01) | |

(52) U.S. Cl.
CPC .............. *C09D 5/035* (2013.01); *C09D 7/62* (2018.01); *C09D 7/63* (2018.01); *C09D 7/80* (2018.01); *C09D 167/00* (2013.01)

(58) Field of Classification Search
CPC ......... E04H 9/021; E04H 9/14; C08G 63/695; C08K 3/34; C08K 9/06; C08K 2003/2241; C08K 2003/3045; C08K 3/22; C08K 3/30; C08K 3/36; C08K 7/26; C08K 9/04; C09D 167/00; C09D 5/033; C09D 5/035; C09D 7/62; C09D 7/63; C09D 7/80; C09D 5/03; C09D 7/61
See application file for complete search history.

(56) References Cited

U.S. PATENT DOCUMENTS

| | | | |
|---|---|---|---|
| 7,244,780 B1 * | 7/2007 | Robinson ............... | C09D 5/036 524/439 |
| 2016/0257845 A1 * | 9/2016 | Park ....................... | F16F 1/024 |

FOREIGN PATENT DOCUMENTS

| | | |
|---|---|---|
| CN | 1330693 A | 1/2002 |
| CN | 103073711 A | 5/2013 |
| CN | 103189456 A | 7/2013 |
| CN | 103923492 A | 7/2014 |
| CN | 105111898 A | 12/2015 |
| CN | 105273581 A | 1/2016 |
| CN | 106752756 A | 5/2017 |
| CN | 109280468 A | 1/2019 |
| CN | 109971318 A | 7/2019 |

OTHER PUBLICATIONS

International Search Report and Written Opinion of PCT/CN2020/071401 dated Mar. 26, 2020, 16 pages (English and Chinese).
Li Zhaoqiang, "Production and application of modern coatings", Shanghai Science and Technology Literature Publishing House, 2nd Edition, Mar. 2017, pp. 203-204, 206-208; Chinese original (7 pages) and English translation (8 pages).
CN First Office Action, Appln No. 2019102113098, dated Jun. 2, 2020, 28 pages (English and Chinese).
CN Second Office Action, Appln No. 2019102113098, dated Dec. 24, 2020, 9 pages (English and Chinese).

* cited by examiner

*Primary Examiner* — Shuangyi Abu Ali
(74) *Attorney, Agent, or Firm* — Dicke, Billig & Czaja, PLLC

(57) ABSTRACT

Provided are a powder coating material for household appliance coiled material and a preparation method thereof. The powder coating material comprises: a polyester resin, a curing agent, a silicate, a filler, a pigment, and an auxiliary agent. The powder coating material for the household appliance coiled material not only can meet the requirements of coating processes of the coiled material, but also has excellent performances such as flexibility, T-bend performance, impact resistance and solvent resistance, while satisfying the requirement for the thick coatings of the household appliance coiled material.

9 Claims, No Drawings

POWDER COATING USED FOR HOUSEHOLD APPLIANCE COILED MATERIAL AND PREPARATION METHOD THEREOF

CROSS-REFERENCE TO RELATED APPLICATIONS

This application is a U S. national stage application, filed under 35 U.S.C. § 371, of International Application No. PCT/CN2020/071401, filed Jan. 10, 2020, which is based upon and claims the priority benefit of Chinese Patent Application No. 201910211309.8, filed on Mar. 20, 2019, the entire contents of each of which are incorporated herein by reference.

TECHNICAL FIELD

The present disclosure relates to the field of powder coating material, and particularly to a powder coating material for household appliance coiled material and a preparation method thereof.

BACKGROUND

Over the past decade, the demand for coil steel is rising rapidly, with the rapid development of construction, home appliances, transportation and other industries in China. The coating material for the coil steel is an important part of the manufacture thereof and also is developed rapidly. At present, almost all prepainted coiled material for household appliance color-sheets is coated with oil-based liquid coating material. However, the oil-based liquid coating material comprises organic solvents (e.g., volatile organic compound, VOC) which are harmful to the environment. General prepainted sheets need to be coated and baked twice, which consumes a lot of energy sources. The coating material industry, every year, discharges waste water, sludge and waste gas that pollute the environment. The discharged VOCs not only harm the health of workers, but also increase domestic environmental pollution, resulting in great harm to humans and environment. Thus, the oil-based coating material for color coated sheets has attracted great attention from relevant national departments and the public. It also has become imperative to replace the oil-based coating material with environmental-friendly coating material.

Compared with the oil-based coating material, the primary problem in applying powder coating material to coiled material system is how to apply the powder coating material continuously and uniformly on a fast coiled material coating line, to quickly cure a coated film without a long coating line, and to be capable of changing color quickly. CN105273581A achieves rapid curing (10 to 30 seconds) by changing the curing method and the formulation of the powder coating material. The coated film has excellent weather resistance as well as acid- and alkali resistance, which is mainly due to the use of a fluorocarbon resin. However, the addition of the fluorocarbon resin may affect the adhesion and T-bend of the coating. For household appliance sheets with thicker coatings, this powder coating material will lead to poor T-bend of the coating. In CN106752756A, a special polyester resin is effectively formulated with other ingredients to solve the problem that, when curing by infrared heating, a traditional polyester resin/HAA system cannot be completely cured in a short time (25 to 30 seconds). resulting in that the impact, hardness. MEK and other properties of the coating cannot meet the requirements of the color coated sheets. For the first time, the disclosed powder coating material has achieved a fast spraying process at a line speed of 60 m/min. However, such powder coating material is mainly used for coating coiled galvanized steel sheets for building material.

Common coiled powder coating material has a thickness ranging from 25 to 40 μm, and can be, for example, used for coating building sheet material. In contrast, the household appliance coiled material has higher requirements for thickness (45 to 80 μm). While, thicker coating will lead to the reduction of the flexibility, T-bend, impact resistance and the like of the whole coating. Since the coil steel sheets for household appliances are prone to bump during the processing thereof, they require high hardness. In addition, since the sheets for the household appliances should have thicker coatings, the hardness, flexibility and T-bend of the common coiled powder coating material cannot meet the performance requirements of the powder coating material for the household appliance coiled material.

SUMMARY

The present disclosure is intended to provide a powder coating material for a household appliance coiled material and a preparation method thereof. The powder coating material for the household appliance coiled material of the present disclosure not only can meet the requirements of coiled material coating processes, but also has excellent performance advantages in, among others, flexibility, T-bend, impact resistance and solvent resistance, with meeting the requirements for the thick coatings of the household appliance coiled material.

The technical solutions employed by the present disclosure are as follows.

One of the objectives of the present disclosure is to provide a powder coating material for a household appliance coiled material, wherein the powder coating material comprises, in parts by weight: 55 to 85 parts of modified polyester resin, 5 to 15 parts of curing agent, 1 to 20 parts of modified silicate, 0 to 35 parts of filler, 0 to 10 parts of pigment, and 0 to 8 parts of auxiliary agent.

Preferably, the powder coating material comprises: 60 to 85 parts of the modified polyester resin, 7 to 10 parts of the curing agent, 5 to 20 parts of the modified silicate, 15 to 35 parts of the filler, 0.5 to 10 parts of the pigment, and 1 to 8 parts of the auxiliary agent.

Preferably, the modified polyester resin is an organosilicon modified carboxyl-terminated polyester resin which has an acid value of 35 to 65 mgKOH/g, and an ICI melt viscosity of 3,000 to 6000 mPa·s at a temperature of 200° C.

Preferably, the organosilicon modified carboxyl-terminated polyester resin is obtained by melt polycondensation of the following main monomer ingredients, by weight: 35% to 45% of diol, 42% to 52% of aromatic diacid, 1.8% to 11.5% of aliphatic diacid, 1.5% to 3.0% of polyol, and 4% to 6% of organosilicon resin.

Preferably, the modified silicate is silicate modified by an amino silane coupling agent and maleic anhydride.

Preferably, the silicate modified by the amino silane coupling agent and maleic anhydride is prepared by a method comprising:
A) drying a silicate to obtain a dried silicate;
B) adding maleic anhydride, hydrogen peroxide and an antioxidant into the dried silicate, mixing, to obtain a maleic anhydride modified silicate; and
C) adding an amino silane coupling agent into the maleic anhydride modified silicate for modification, to obtain the silicate modified by the amino silane coupling agent and maleic anhydride.

In order to make the modified silicate have good surface wettability, the method comprises, after modifying the silicate together by the amino silane coupling agent and the maleic anhydride, the steps of adding a titanate coupling agent and an aluminate coupling agent, mixing, and then adding butyl stearate and mixing, to obtain the modified silicate with good surface wettability. It is beneficial to full melt mixing of the modified silicate with other components in the powder coating material.

Preferably, in step A), the silicate is dried until a moisture content of the silicate is less than 3%.

Preferably, the modified silicate is selected from modified porous silicate.

Preferably, the method for preparing the modified porous silicate is the same as that of the modified silicate, except that the silicate is replaced with the porous silicate in step 1).

Preferably, the modified silicate or porous silicate is selected from modified calcium silicate or modified porous calcium silicate.

Preferably, the curing agent is at least one selected from beta-hydroxyalkylamide and blocked isocyanate.

Preferably, the curing agent comprises beta-hydroxyalkylamide and blocked isocyanate.

More preferably, the curing agent comprises beta-hydroxyalkylamide of 70 to 90 wt %.

Preferably, the filler is at least one selected from barium sulfate, silica powder, mica powder, and rutile titanium dioxide.

Preferably, the pigment is selected from outdoor general-purpose pigments, such as iron oxide red, carbon black, ultramarine, iron yellow, phthalocyanine blue, and phthalocyanine green.

Preferably, the auxiliary agent is at least one selected from a leveling agent, an antioxidant, a degassing agent, and an air-permeabilizing agent.

Preferably, the leveling agent is selected from acrylate-based leveling agents.

Preferably, the antioxidant is at least one selected from antioxidant 168, antioxidant 3114, antioxidant DLTDP, antioxidant 1010, and antioxidant 1076.

Preferably, the degassing agent is at least one selected from benzoin, permeable wax and polyether.

More preferably, the wax powder is at least one selected from micronized modified polyethylene wax, polypropylene wax powder, and polytetrafluoroethylene wax.

Another objective of the present disclosure is to provide a method for preparing said powder coating material, which comprises;
1) weighing each ingredient in proportion, fully mixing and crushing, to obtain a mixed material, and
2) extruding the mixed material in an extruder, tableting and crushing, to obtain the powder coating material.

Preferably, the powder coating material has a D50 particle size of 35 to 45 μm.

The present disclosure has at least the following beneficial effects.

1. In the present disclosure, the calcium silicate powder is modified by both the amino silane coupling agent and maleic anhydride. The silicon-oxygen bond in the modified calcium silicate forms a hydrogen bond with the carbonyl group of the acid anhydride; the amino silane coupling agent can form an amide bond with the carboxyl-terminated polyester resin; and the beta-hydroxyalkylamide forms an ester bond with the resin. This strengthens the bonding ability between the silicate and the resin. In addition, the amide and ester bonds form a large number of hydrogen bonds, which leads to better compatibility between the inorganic filler and organic resin in the coating material, and makes the coating form a whole compact structure. Moreover, the organosilicon modified polyester resin in the coating can improve the flexibility and solvent resistance of the coating material. Therefore, over the same curing time, the powder coating material for the household appliance coiled material according to the present disclosure has better flexibility, impact resistance, T-bend and other properties than the common coiled powder coating material.

2. The organosilicon modified polyester resin has a high acid value. The whole coating has high crosslinking density. The organosilicon modified polyester resin reacts with the blocked isocyanate, which improves the crosslinking density of the coating. Meanwhile, the porous silicate can increase the hardness of the coating due to the pore structures therein. Such increased hardness can prevent the equipment from scratching the coating of the household appliance coiled material during the processing thereof, thereby reducing crashing scratches. In addition, the porous silicate, due to the pore structure therein, can make the true density of the powder coating material of the present disclosure lower than that of the common coil steel powder coating material. Under the same construction condition, the powder coating material of the present disclosure has higher coating utilization rate, and the powder coating material of the same weight can spray more coiled sheets.

3. The powder coating material of the present disclosure can meet the requirements of the coiled material coating process. It can be completely cured within 30 seconds under exposure to near infrared light, and can obtain smooth and flat coating appearance at a line speed of 60 m/mm.

4. Based on a basic formulation of the powder coating material, the present disclosure has many advantages such as no organic solvent, simple process, one-time bake molding, no VOC-discharge. The present disclosure further has lower production cost, higher efficiency, being environmental friendly, energy saving and the like as compared with the traditional household appliance powder electrostatic spraying.

Table 1 shows the comparison of the comprehensive properties of the household appliance powder coating of the present disclosure with those of conventional building material powder coating:

TABLE 1

| Comparison items | household appliance powder coating material | Standards of household appliance powder coating material | Conventional building material powder coating material | Standards of conventional building material sheet |
|---|---|---|---|---|
| Appearance | Smooth and flat | Smooth and flat | Smooth and flat | GB-T13448-2006 Test Methods for Prepainted Steel Sheet (Galvanized steel sheets with a thickness of 0.35 to 0.45 mm of powder coating for home appliance sheets and conventional building material) |
| Curing time | 25 to 30 seconds | / | 25 to 30 seconds | |
| Coating process | 2 coatings and 1 baking (2C1B) | / | 2C1B | |
| Coating speed (m/min) | 60 to 100 | / | 60 to 100 | |
| Film thickness | 45 to 80 μm | / | 25 to 40 μm | |
| Pencil hardness | 3 H | GB/T 6739-2006 | 2 H | |
| Impact | ≥50 kg · cm | GB/T 1732-1993 | ≥9 J | |
| Xenon lamp aging (1,000 h) | Gloss retention 90% | GB/T1865-2009 | Gloss retention 82% | |
| MEK | ≥150 times | GB-T13448-2006 | ≥100 times | |
| T-bend | 0 T | GB-T13448-2006 | 0 to 1 T | |
| Acid- and alkali resistance | No foaming or peeling off within 240 hours | GB 9274-1988 | No foaming or peeling off within 168 hours | |

DETAILED DESCRIPTION

The present disclosure is further illustrated with reference to the following examples. It should also be understood that the following examples are only intended to further illustrate the present disclosure, and cannot be construed as limiting the protection scope of the present disclosure. Those non-essential improvements and modifications made by those skilled in the art according to the principles of the present disclosure all fall into the protection scope of the present disclosure. The specific process parameters used in the following examples are only one example in an appropriate range. Those skilled in the art can make choices in the appropriate range based on the illustration herein. The present disclosure is not limited to the specific data of the following examples.

The present disclosure will be described in details with reference to the examples and comparative examples. The ingredients of the powder coating material of each example and comparative example are as shown in Table 2 below.

TABLE 2

| Ingredients | | Example 1 | Example 2 | Example 3 | Example 4 | Comparative Example 1 |
|---|---|---|---|---|---|---|
| Organosilicon modified polyester resin (with an acid value of 35-65 mgKOH/g, and an ICI melt viscosity of 3,000-5,000 mPa · s at a temperature of 200° C.) | | 75 | 70 | 75 | 80 | 75 |
| Curing agent | Beta-hydroxyalkylamide | 7.3 | 6.7 | 7.3 | 8.9 | 7.3 |
| | Blocked isocyanate | 1 | 1 | 1 | 1 | 1 |
| Modified porous calcium silicate | | 5 | 10 | 15 | 20 | 0 |
| Filler | Barium sulfate | — | — | 10 | — | — |
| | Rutile titanium dioxide | 30 | 28 | 5 | 1 | 10 |
| | Silica powder | — | — | — | 15 | 25 |
| Pigment | Phthalocyanine blue | 2 | — | 2 | — | — |
| | Ultramarine | 5 | 0.5 | — | — | — |
| | Carbon black | 0.1 | 0.2 | 0.8 | 0.5 | 0.3 |
| | Iron oxide red | — | 0.5 | 0.4 | — | 0.4 |
| | Ciba phthalocyanine green | — | — | — | 0.5 | — |
| | Iron oxide yellow | — | — | — | 2 | 2 |
| Leveling agent | Acrylate leveling agent | 1.2 | 1.5 | 1.2 | 1.5 | 1.5 |
| Degassing agent | Benzoin | 0.5 | 0.5 | 0.5 | 0.7 | 0.7 |
| | Micronized polyethylene wax | 0.8 | — | 0.8 | — | 0.4 |
| | Micronized polytetrafluoroethylene wax | — | 0.8 | — | 0.8 | 0.4 |

The process for preparing the powder coating material for the household appliance coiled material of Examples 1 to 4 and Comparative Example 1 comprised:

1) weighing each ingredient according to Table 2, fully mixing in a mixing cylinder and crushing, to obtain a mixed material; and
2) melting, mixing, uniformly dispersing and extruding the mixed material in a twin-screw extruder, in which area I had a temperature of 95-105° C. and area II had a temperature of 100-105° C.; then tabletting, cooling and crushing by a tabletting machine; grinding by a special grinder and sieving, to obtain powder coating material having a D50 particle size of 25-45 μm.

The process for preparing the organosilicon modified polyester resin and modified porous calcium silicate of Examples 1 to 4 comprised:

1. The polyester resin of the present disclosure was an organosilicon modified carboxyl-terminated polyester resin with an acid value of 35-65 mgKOH/g and a viscosity of 3,000-5,000 (ICI, mPa·s/200° C.), which was mainly obtained by melt poly condensation of the following monomer components, by weight:
   35-45% of diol,
   42-52% of aromatic diacid,
   1.8-11.5% of aliphatic diacid,
   1.5-3.0% of polyol, and
   4-6% of organosilicon resin.

Add the proportion of the diol, polyol and organosilicon resin into a reaction vessel; heat until the material was melted; then sequentially add the proportion of aromatic diacid, an esterification catalyst, and dibutyltin laurate; introduce nitrogen and continue to heat up, until esterified water started to be generated and distilled out at 185° C.; gradually heat up to 240° C. and react for 10-13 h, until 95% of the esterified water was discharged and the acid value reached 20-24 mgKOH/g; then add an acid dissolution reagent to react for 1.5-2.5 h, until the acid value reached 45-75 mgKOH/g; carry out vacuum polycondensation for 2-3 h, until the acid value reached 35-65 mgKOH/g; stop the reaction, resulting in the organosilicon modified polyester resin.

2. The process for preparing the modified porous calcium silicate:
   1) putting porous calcium silicate powder into a high-speed mixer for rotary drying, at a drying temperature of 110-130° C. for 40-120 min, to obtain the porous calcium silicate powder with a moisture content lower than 3%;
   2) to the obtained porous calcium silicate powder, adding 1% of maleic anhydride, 1% of hydrogen peroxide and 1% of an antioxidant, accounting for the weight of the porous calcium silicate powder; then mixing in the high-speed mixer at 75° C. for 1 hour, to obtain maleic anhydride modified porous calcium silicate;
   3) to the obtained maleic anhydride modified porous calcium silicate, adding 1% of an amino silane coupling agent (accounting for the weight of the maleic anhydride modified porous calcium silicate); and reacting in the high-speed mixer at 100-120° C. for 20-30 min, to obtain the porous calcium silicate modified by the amino silane coupling agent and maleic anhydride; and
   4) to the obtained porous calcium silicate modified by the amino silane coupling agent and maleic anhydride, adding 1% of a titanate coupling agent and 1% of an aluminate coupling agent (accounting for the weight of the porous calcium silicate modified by the amino silane coupling agent and the maleic anhydride); mixing in the high-speed mixer at 95-105° C. for 15-20 min; then adding a butyl stearate at 75° C. and mixing for 5-10 minutes, to obtain the modified calcium silicate with good surface wettability.

Performance Tests

The powder coating materials prepared in Examples 1 to 4 and Comparative Example 1, commercially available coiled building materials were used for the following performance tests:

1. Gloss tested according to GB/T 9754;
2. Pencil hardness tested according to GB/T 6739-2006;
3. Impact performance tested according to GB/T 1732-1993;
4. Xenon lamp ageing (1,000 hours) tested according to GB/T 1865-2009;
5. Solvent resistance (MEK) tested according to GB/T 12754-2006;
6. T-bend performance tested according to GB/T 12754-2006;
7. Acid- and alkali resistance test according to GB 9274-1988; and
8. Appearance evaluated according to visual observation.

The results were shown in Table 3.

TABLE 3

| Comparison items | Example 1 | Example 2 | Example 3 | Example 4 | Comparative Example | Powder coating material for building materials |
|---|---|---|---|---|---|---|
| Coating process | 2C1B | 2C1B | 2C1B | 2C1B | 2C1B | 2C1B |
| Curing time | 30 seconds | 30 seconds | 30 seconds | 30 seconds | 30 seconds | 30 seconds |
| Line speed | 60 m/min | 60 m/min | 60 m/min | 60 m/min | 60 m/min | 60 m/min |
| Gloss | 75 GU | 82 GU | 85 GU | 87 GU | 85 GU | 40-60 GU |
| Appearance | Smooth and flat | Smooth and flat | Smooth and flat | Smooth and flat | Smooth and flat | Smooth and flat |
| Film thickness | 45-80 μm | 45-80 μm | 45-80 μm | 45-80 μm | 45-80 μm | 45-80 μm |
| Pencil hardness | 3 H | 3 H | 3 H | 3 H | 2 H | 2 H |
| Impact | 50 kg · cm | 50 kg · cm | 50 kg · cm | 50 kg · cm | 50 kg · cm | 50 kg · cm Cracked |

TABLE 3-continued

| Comparison items | Example 1 | Example 2 | Example 3 | Example 4 | Comparative Example | Powder coating material for building materials |
|---|---|---|---|---|---|---|
| Xenon lamp aging (1,000 hours) | Gloss retention ≥82% | Gloss retention ≥85% | Gloss retention ≥87% | Gloss retention ≥90% | Gloss retention ≥90% | Gloss retention 82% |
| MEK | 188 times | 182 times | 180 times | 175 times | 155 times | 120 times |
| T-bend | 0 T | 0 T | 0 T | 0 T | 1 T | 1 T-2 T |
| Acid- and alkali resistance | No foaming or peeling off within 240 hours | No foaming or peeling off within 240 hours | No foaming or peeling off within 240 hours | No foaming or peeling off within 240 hours | No foaming or peeling off within 240 hours | Foaming and peeling off within 240 hours |

What is claimed is:

1. A powder coating material for household appliance coiled material, comprising, in parts by weight: 55 to 85 parts of modified polyester resin, 5 to 15 parts of curing agent, 1 to 20 parts of modified silicate, 0 to 35 parts of filler, 0 to 10 parts of pigment, and 0 to 8 parts of auxiliary agent; wherein the modified polyester resin is an organosilicon modified carboxyl-terminated polyester resin, which has an acid value of 35 to 65 mgKOH/g; wherein the modified silicate is a modified porous silicate modified by an amino silane coupling agent and maleic anhydride; and wherein the curing agent comprises beta-hydroxyalkylamide and blocked isocyanate.

2. The powder coating material according to claim 1, wherein the powder coating material comprises: 60 to 85 parts of the modified polyester resin, 7 to 10 parts of the curing agent, 5 to 20 parts of the modified silicate, 15 to 35 parts of the filler, 0.5 to 10 parts of the pigment, and 1 to 8 parts of the auxiliary agent.

3. The powder coating material according to claim 1, wherein the modified polyester resin has an ICI melt viscosity of 3000 to 6000 mPa·s at a temperature of 200° C.

4. The powder coating material according to claim 1, wherein the filler comprises at least one selected from barium sulfate, silica powder, mica powder, and rutile titanium dioxide; the pigment is selected from outdoor general-purpose pigments; and the auxiliary agent comprises at least one selected from a leveling agent, an antioxidant, a degassing agent, and an air-permeabilizing agent.

5. A method for preparing the powder coating material according to claim 1, comprising: 1) weighing each ingredient in proportion, mixing and crushing, to obtain a mixed material; and 2) extruding the mixed material in an extruder, tableting and crushing, to obtain the powder coating material.

6. The method according to claim 5, wherein the powder coating material has a D50 particle size of 35 to 45 μm.

7. The method according to claim 5, wherein the powder coating material comprises: 60 to 85 parts of the modified polyester resin, 7 to 10 parts of the curing agent, 5 to 20 parts of the modified silicate, 15 to 35 parts of the filler, 0.5 to 10 parts of the pigment, and 1 to 8 parts of the auxiliary agent.

8. The method according to claim 5, wherein the modified polyester resin has an ICI melt viscosity of 3000 to 6000 mPa·s at a temperature of 200° C.

9. The powder coating material according to claim 5, where in the filler comprises at least one selected from barium sulfate, silica powder, mica powder, and rutile titanium dioxide, the pigment is selected from outdoor general-purpose pigments; and the auxiliary agent comprises at least one selected from a leveling agent, an antioxidant, a degassing agent, and an air-permeabilizing agent.

* * * * *